June 7, 1932. A. D. MacLELLAN 1,862,412
MIXER AND SIFTER
Original Filed Nov. 8, 1929
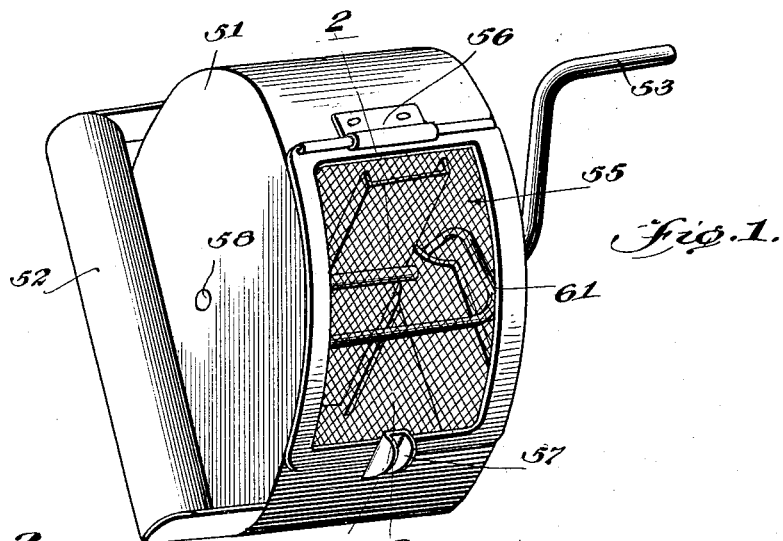
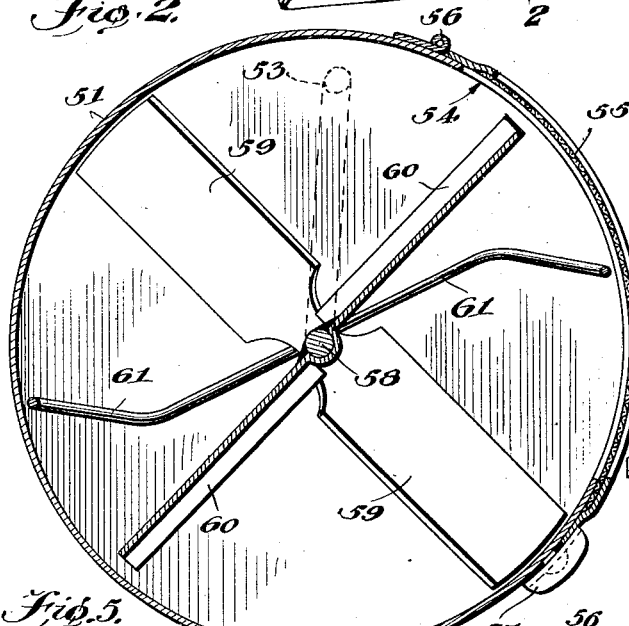
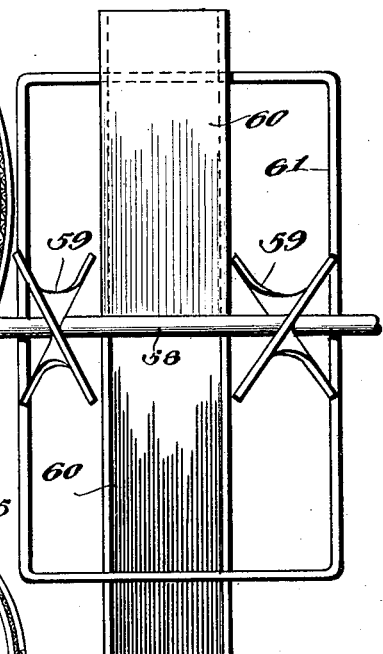
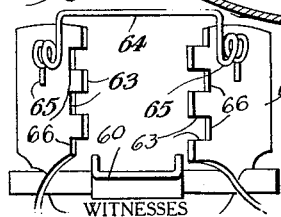
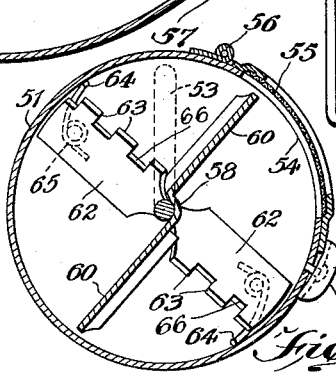
INVENTOR
A. D. MacLellan,
BY
ATTORNEYS Patented June 7, 1932

1,862,412

UNITED STATES PATENT OFFICE

ANGUS D. MacLELLAN, OF OWENSBORO, KENTUCKY

MIXER AND SIFTER

Application filed November 8, 1929, Serial No. 405,813. Renewed October 24, 1931.

This invention relates to improvements in mixers and sifters and it consists of the constructions, combinations and arrangements herein described and claimed.

An object of the invention is to provide a mixer and sifter primarily but not exclusively intended for household use in sifting flour, a feature of no less importance than its fundamental simplicity being an arrangement of the rotor for agitating the flour and thoroughly mixing the ingredients should a compound be placed in the mixing drum.

A further object of the invention is to provide a combined mixer and sifter wherein certain edges of the rotor paddles are serrated not only to intensify the mixing action and to shorten the mixing period but also to aerate the substances being mixed or sifted thus having a beneficial effect on the substances especially if one be flour.

Other objects and advantages will appear in the following specification, in which:—

Figure 1 is a perspective view of the sifting apparatus as adapted to hand or household use.

Fig. 2 is a cross-section taken on the line 2—2 of Fig. 1.

Fig. 3 is a detail plan view of the rotor.

Fig. 4 is a cross-section similar to Fig. 2 illustrating the serrated wings referred to above.

Fig. 5 is a detail elevation of a portion of the wing assemblage of Fig. 4.

This application is a continuation in part of an application for patent for mixing apparatus filed by Angus D. MacLellan, August 18, 1926, Serial No. 130,005, Patent No. 1,738,440, Dec. 3, 1929. The latter application is concerned with mixing apparatus particularly intended for handling relatively large masses of material. The instant device is intended to handle relatively small masses of material, for which purpose it is adapted to hand or household use.

Flour is the substance herein chosen for illustration to be operated upon by the sifter, but realizing that quite often the housewife will mix flour with other powdery ingredients, for example, yeast powder, some of the features of the foregoing application have been incorporated thus to compose a combined hand mixer and sifter.

Reference is made to Figs. 1 to 5 which disclose the principle of the apparatus as modified for hand or household use. The mixing drum 51 has a handle 52 at one end by which the device is supported in a more or less stationary position and a crank handle 53 at the other end. The drum has an opening 54 at which the ingredients to be mixed are introduced. This opening has a screened lid 55, hinged at 56 and held closed by a latch 57.

A shaft 58, of which the crank handle 53 is a part, is journaled upon the ends of the drum 51. This shaft carries a pair of wings 59 at each side of a centrally located pair of pans 60. It also carries a pair of bent wires 61 which are intended to strike across the screen of the lid 55 and keep the interstices clear and to aid the sifting process when sifting out mixture.

Twists between the wings 59 of each of the pairs mentioned cause such wings to be offset in respect to each other as shown in Figure 3, thereby forming the equivalent of certain hoppers mentioned in connection with the previously mentioned application. It is noted that in Figs. 2 and 3 the wings 59 or so-called hoppers are attached to and are revoluble with the shaft 58 in common with the pans 60.

Figs. 4 and 5 illustrate a structure closely allied with that already described, corresponding parts being identified by similar reference characters. The wings, now designated 62, are disposed in the drum and formed precisely like the wings 59 with the exception that the confronting edges (Fig. 5) are serrated to produce projections 63.

It is to be observed in these serrations that the projections or teeth on the edge of one wing are directly across from the recesses 66 in the edge of the opposite wing. Thus the projections are staggered and the channel, if such it may be called, defined by the confronting serrations constitutes a tortuous passageway which has a very pronounced mixing action on the flour as it passes through.

Another effect is that the period of mixing is shortened, but what is more important, the disturbance of the flour stream, caused by the serrated edges, has the result of aerating the flour. This aeration is very beneficial to some substances, especially flour.

Instead of attaching the scraper wires 64 to the shaft 58, as in the instance of the wires 61 in Fig. 2, they are carried by the wings 62. Spring coils 65 are formed in these wires at places adjoining the points of attachment so as to impart the desirable resiliency and yieldability, which in Fig. 2 is obtained by making the sides of the wire of substantial length.

The operation is readily understood. The user will open the lid 55 and charge the drum 51 with the ingredients to be mixed. While mixing, the lid may be left open or it may be closed, as desired, but in either case wings 59 and pans 60 will have the same mixing effect as that already described. After the mixing has been done, the user after closing the screened lid 55, may turn the drum so that the screened lid shall be at the bottom and then turn the crank and sift out material through the screen. The apparatus may be thus used to sift material already mixed or which does not need to be mixed.

The outer side edges of the wings 59 are adapted to bear against and scrape the sides or ends of the drum 51. This feature serves the important purpose of keeping the drum ends clear of any of the powdered material that would otherwise tend to adhere thereto. It will require only very few turns of the handle 53 to sift the flour, the action of the wings 59 and pans 60 being to so stir up or agitate the flour that every portion of the screen 55 will be utilized in the sifting operation. In addition to this effective purpose of the device as a sifter, the wings and pans produce a thorough commingling of any ingredients of a compound introduced into the drum.

It requires but a brief allusion to Figs. 4 and 5 to point out that it is the serrated edges 63, 66 that constitute the outstanding feature. As shown in respect to one set of the wings 62 in Fig. 5, the serrations confront each other. There is the same relationship of serrations in the other set of wings. These sets of paddles are inclined inwardly by virtue of the twist given to them at their points of connection with the shaft 58 (Fig. 3), thus when the wings pass through the substance the mixing action is greatly intensified and by virtue of the increased turbulence that the serrations produce the substance is aerated to a noticeable extent. As has been pointed out before, this is especially beneficial to flour.

The foregoing action of the wings 62 is only partly due to the confronting serrations and principally due to the fact that each recess 66 is opposed by a projection 63. This converts every projection into a small shovel which is enabled to act as such only by virtue of its being opposite to a recess into which the volume of material which it individually carries may be discharged. As a result of this arrangement streams of material are caused to flow in alternately opposite directions into the channel between the wings, and the result of this peculiar relationship is a very thorough commingling of the ingredients and a very marked reduction in the time required for the accomplishment of a particular mix.

In other words, the fact that the projections 63 and recesses 66 do not match, but rather are staggered in respect to each other, constitutes that quality of the device which is productive of the foregoing advantages. Of necessity the wings are spaced in the direction of the axis of the shaft, but to illustrate the foregoing point, if the wings were brought close together the projections and recesses would fit together like the teeth of a pair of gear wheels. In practice it is necessary to proportion the serrations to the spaced distance of the wings. For example, if the wings are 12″ apart at the closest point it will be necessary to have the projections 63 and recesses 66 approximately 4″ wide.

While the construction and arrangement of the improved mixer and sifter is that of a generally preferred form, obviously modifications and changes may be made without departing from the spirit of the invention and the scope of the claims.

I claim:—

1. Apparatus of the character described comprising a drum having a handle by which it may be suspended, said drum having an opening, a shaft journaled upon the drum having a crank handle, a centrally located pair of pans for lifting portions of material charged into the drum through said opening, and pairs of wings disposed at angles to each other being situated at the sides of the pans and working close to the ends of the drum for agitating the material.

2. Apparatus of the character described comprising a drum having a handle by which it may be suspended, said drum having an opening, a shaft journaled upon the drum having a crank handle, a centrally located pair of pans for lifting portions of material charged into the drum through said opening, pairs of wings disposed at angles to each other to traverse the space between the edges of the pans and the ends of the drum for agitating the material, a screened lid applied to the drum over said opening for sifting the material agitated by the pans and wings, and bent wires arranged to revolve with the shaft to strike across the screen of the lid to clear the interstices.

3. A mixer comprising a drum having an opening through which material is charged, a shaft extending into the drum and having means by which it can be turned, means constituting a pan carried by the shaft, and oppositely angled wings disposed laterally of the pan and carried by the shaft in confronting relationship to the ends of the drum.

4. A mixer comprising a drum having an opening through which material is charged, a shaft extending into the drum and having means by which it can be turned, means constituting a pan carried by the shaft, oppositely angled wings disposed laterally of the pan and carried by the shaft in confronting relationship to the ends of the drum, and a wire fixed to travel with the shaft being disposed close to the periphery of the drum.

5. A mixer comprising a drum, a revoluble shaft extending into the drum, and oppositely angled pairs of wings carried by the shaft having staggered serrations along the confronting edges, said wings scooping up a volume of the material and causing a turbulence in said material by virtue of diversely directing the material past said serrations into the channel between the wings.

6. A mixer comprising a drum, a revoluble shaft extending into the drum, pairs of parallel wings disposed at angles to each other and extending in different directions from the shaft, and serrations along confronting edges of the wings comprising staggered projections and recesses.

7. A mixer comprising a drum, a revoluble shaft extending into the drum, pairs of parallel wings disposed at angles to each other and extending in different directions from the shaft, serrations along confronting edges of the wings serving to accentuate the mixing action when the wings are propelled through the material and serving to aerate said material in the drum, and pans carried by the shaft in alternation with the wings for lifting portions of the material and coacting with the wings in performing the mixing operation.

8. A combined mixer and sifter comprising a drum with an opening, a screen to cover the opening, a rotor operable in the drum having pans for lifting portions of the material charged into the drum and wings for agitating said material, and a flexible wire to scrape the inner periphery of the drum as well as the screen being attached to said wings.

9. A mixer comprising a batch container, a revoluble shaft occupying a working position in reference to the container, and a pair of mixing wings carried by the shaft being pitched toward each other and having spaced adjacent serrated edges, the confronting projections and recesses of which are in staggered opposition.

10. A mixer comprising a batch container, a revoluble element occupying a working position in reference to the container, and mixing means carried by said element comprising plural members having opposed and spaced projections lined up radially along said members and staggeredly arranged for causing flows from one side to occur between flows from the opposite side.

11. A mixer comprising a batch container, a revoluble element occupying a working position in reference to the container, mixing means carried by said element comprising plural members having opposed and spaced projections lined up radially along said members and staggeredly arranged for causing flows from one side to occur between flows from the opposite side, and other means working in the space between said projections to intercept the flows.

ANGUS D. MacLELLAN.